United States Patent [19]

Edwards

[11] 4,236,954
[45] Dec. 2, 1980

[54] LABEL APPLICATOR

[75] Inventor: Frederick H. Edwards, Mentone, Australia

[73] Assignee: Vinyl Clad Proprietary Limited, Victoria, Australia

[21] Appl. No.: 4,590

[22] Filed: Jan. 18, 1979

[30] Foreign Application Priority Data

Jan. 19, 1978 [AU] Australia .............................. PD 3071

[51] Int. Cl.³ ............................................ C05G 15/00
[52] U.S. Cl. .................................... 156/352; 156/380; 156/500; 156/572; 264/22; 271/261; 425/174.8 E
[58] Field of Search ............... 156/270, 380, 500, 352, 156/357, 362, 363, 571, 572, DIG. 31; 271/18.1, 18.2, DIG. 3, DIG. 9, 193, 98, 258–261, 110, 111; 264/132, 275, 22; 425/174.8 R, 174.8 E, 129 R

[56] References Cited

U.S. PATENT DOCUMENTS

| 2,961,715 | 11/1960 | Morin | 264/263 X |
|---|---|---|---|
| 3,129,130 | 4/1964 | Lerner et al. | 156/380 X |
| 3,270,101 | 8/1966 | Jardine et al. | 156/380 X |
| 3,324,508 | 6/1967 | Dickinson | 264/22 X |
| 3,508,993 | 4/1970 | Belcher et al. | 156/380 X |
| 3,556,514 | 1/1971 | Stockman | 264/22 X |
| 3,559,248 | 2/1971 | Stockmann | 264/22 X |
| 3,966,197 | 6/1976 | Riedl et al. | 271/260 |

FOREIGN PATENT DOCUMENTS

| 274565 | 6/1964 | Australia . |
| 4477668 | 10/1968 | Australia . |
| 408069 | 1/1969 | Australia . |
| 445676 | 1/1971 | Australia . |
| 448053 | 2/1971 | Australia . |
| 430449 | 12/1971 | Australia . |
| 470934 | 11/1972 | Australia . |
| 463974 | 11/1972 | Australia . |
| 466732 | 1/1973 | Australia . |

Primary Examiner—David A. Simmons
Attorney, Agent, or Firm—Learman & McCulloch

[57] ABSTRACT

A label applicator for an injection moulding machine which includes a suction head for picking up a label, an electrostatic charging device to electrostatically charge the label and means to reverse the suction to transfer the label to the face of a die where it is held by electrostatic forces. The label applicator also includes sensing pins which will actuate a switch to close down the injection moulding machine if the label is not correctly positioned to cover the sensing pins.

9 Claims, 4 Drawing Figures

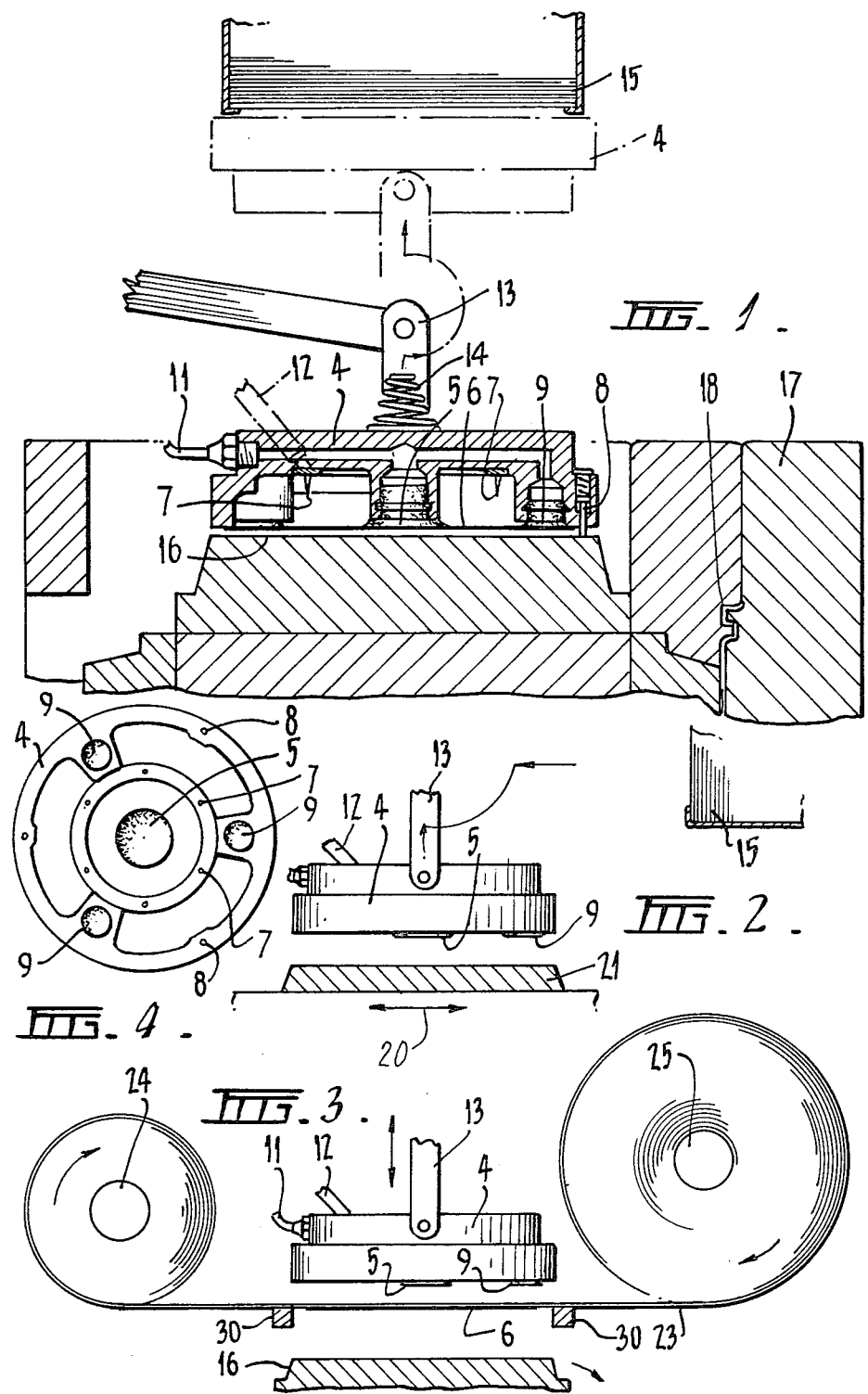

LABEL APPLICATOR

This invention relates to the labelling of moulded products, particularly injection moulded products.

The time and labour content involved in applying labels to moulded plastic products subsequent to the moulding step is quite high. It has been proposed previously to insert labels into the mould and then to inject the plastic and mould the product onto the label. Australian Pat. No. 274,565 relates to a method of inserting a film into a mould cavity and injecting a molten thermoplastic into the cavity whereby the film which contains printed matter is fused to the moulded product.

Australian Patent Specification No. 44776/68 describes an apparatus for placing a label into a mould cavity during the sequence of mould operations when the mould parts are open. An apparatus of this kind requires precise sequential movements of the label inserting arm and the mould parts, otherwise serious damage to the mould can occur. Further, the moulding time for each product tends to be lengthened and this reduces output volumes for the moulding machines.

It is an object of this invention to provide means for label application during the moulding operation which overcomes some of these short-comings of the prior art.

To this end, the present invention provides in association with an injection moulding die, a label applicator comprising a label hopper, a label pickup head mounted on an arm, said arm being movable from a position adjacent said label hopper to a position abutting a wall of said die, said label pickup head incorporating suction means to pickup and retain said label, electrostatic means to charge said label for adherence to a wall of said die, and means to transfer said label to the wall of said die, said pickup head also incorporating a sensing device for sensing the presence of a label on said pickup head. The pickup head includes electrostatic charge means which creates an electrostatic charge on said label which will adhere it to the wall of the die. Reversal of the vacuum ensures transfer of the label to the die wall surface.

This invention is particularly useful with injection moulding equipment in which the label is adhered to a wall of the die inside the mould. However, it is equally useful with a movable mould part having a plurality of faces which move from a position in which a label is applied to a position wherein said face forms part of the die. This latter construction for the die mould is preferred, as it eliminates the possibility of the applicator head being trapped in the die mould.

One particular embodiment of this invention will now be described with reference to the drawings in which:

FIG. 1 illustrates the label applicator of this invention in use with a rotary core attachment of an injection moulding machine.

FIG. 2 illustrates an alternative arrangement.

FIG. 3 illustrates a further type of label applicator according to this invention; and FIG. 4 is an underneath plan view of the label applicator.

The label applicator 4 comprises a generally cylindrical body having a central suction or pressure outlet 5 and three peripheral suction outlets 9, each of which communicates with label face 6. These outlets 5 and 9 are connected to a vacuum or pressure source by the connecting tube 11. Also communicating with the label face 6 of applicator 4 are the electrostatic charge device 7 and three peripheral label detectors 8. Power head 12 connects the charge device 7 to a source of electric power.

The applicator 4 is carried by the applicator arm mechanism 13 which transfers the applicator 4 from the label hopper 15 to the face 16 of a label carrier and rotary core of an injection moulding machine shown partially as 17. The rotating core carries a label into the injection moulding machine cavity 18.

The sequence of movements of the applicator is:

(1) Contacting label hopper 15; vacuum is applied via tube 11 so that a label is attached to label face 6 through the suction applied by outlets 5 and 9.

(2) The mechanism 15 moves applicator 4 away from hopper 15.

(3) Applicator 4 revolves through 180° C.

(4) The mechanism 13 moves applicator 4 to contact the surface of rotary core 16.

(5) Electrostatic charge device 7 charges the label to secure it to the surface of the rotary core 16.

(6) Air pressure is then applied through tube 11 to outlets 5 and 9 and thus ensures separation of the label from the applicator 4.

(7) Steps (4), (3), and (2) then occur in that sequence and the steps then recommence with step (1).

The details of the rotary core portion of the injection moulding machine are described in copending Application No. PD 3070.

The label detectors 8 comprise three spaced apart plunger members or pins resiliently spring biased outwardly of the applicator head 4. and the pins are so positioned on the head with respect to the size and shape of the label that the pins contact the marginal edge of the label when the latter occupies the correct position on the head. If a label is not present on the head, or is incorrectly positioned thereon, one or more of the pins 8 will be exposed for direct engagement with the rotary core 16. The pins 8 are electrically conductive and form part of an electrical circuit linked to an earth leakage switch controlling the operation of the injection molding machine. Should any one of the pins directly contact the electrically conductive core 16, such circuit will be altered, thereby disabling operation of the molding machine. The spring 14 is a further safety detection which deactivates the mechanism controlling movement of the applicator should it come in contact with a metal surface. This spring 14 is particularly useful when the applicator is inserted directly into a die moulding cavity to apply a label to a cavity wall.

FIG. 2 illustrates an alternative arrangement of applicator 4 in association with a sliding core label carrier which reciprocates between a position in which it is in the die and a position adjacent the applicator. The arrow 20 illustrates the direction of movement of applicator 4, namely:

(1) The label is picked up from label hopper 15 by vacuum through outlets 5 and 9.

(2) Applicator 4 moves away from hopper 15 which, in this embodiment, is located at right angles and to the side of the face of the die to which the label is applied.

(3) Applicator 4 revolves through 90° C.

(4) Applicator 4 moves to contact the surface 21 of the sliding core.

The charging device 7 and label detector 8 function identically to the embodiment of FIG. 1.

The arrangements of the applicators in FIGS. 1 and 2 can be used in association with any suitable form of injection moulding machine.

FIG. 3 illustrates an alternative means of using applicator 4 when used in conjunction with a rotary core 16 as described with reference to FIG. 1. Instead of a label hopper, labels are affixed to a web 23 mounted on rolls 24 and 25.

Label applicator 4 moves in a vertical line between the supports 30 and, in so doing, separates a label from web 23 and carries it to the die face 16.

This arrangement of the applicator is also useful with any type of injection moulding apparatus.

Conveniently, the sequence of movements of the label applicators described with reference to FIGS. 1, 2 and 3 are actuated by movement of the die elements.

I claim:

1. In a label applicator having a label pickup member operable to receive a label from a supply thereof and transfer such label to another member, means for holding such label on said pickup member during its transfer, and means for releasing such label from said pickup member upon completion of such transfer, the improvement comprising sensing means carried by said pickup member for sensing the presence on said pickup member of a label, said sensing means being so positioned on said pickup member with reference to the size and shape of such label as to be exposed to and engageable with said another member should such label occupy any position in said pickup member other than a predetermined position.

2. A label applicator according to claim 1 wherein said another member comprises a part of a mold of an injection molding machine.

3. In a label applicator having a label pickup head operable to support and transfer a label to a carrier for subsequent placement of said label in a die cavity of an injection molding machine, means for holding such label on said head during its transfer to said carrier, and means for releasing such label from said head upon completion of such transfer, the improvement comprising sensing means carried by said head for sensing the presence on said head of a label, said sensing means being so positioned on said head with reference to the size and shape of said label as to be exposed to and engageable with said carrier should said label occupy any position on said head other than a predetermined position.

4. A label applicator according to claim 3 wherein said sensing means comprises a plurality of individual members arranged on said head in a manner to engage the marginal edge of said label when the latter occupies said predetermined position on said head.

5. A label applicator according to claim 3 wherein the means for holding said label on said head comprises suction generating means applicable to said label via passages formed in said head.

6. A label applicator according to claim 3 wherein said sensing means and said carrier are elecrically conductive.

7. A label applicator according to claim 3 wherein said sensing means comprises three plunger members spaced apart from one another and resiliently biased in a direction outwardly of said head.

8. A label applicator according to claim 3 wherein the means for holding said label on said head comprises electrostatic charge generating means carried by said head.

9. A label applicator according to claim 8 wherein the means for holding said label on said head includes suction generating means applicable to said label via passages formed in said head.

* * * * *